Figure 1:
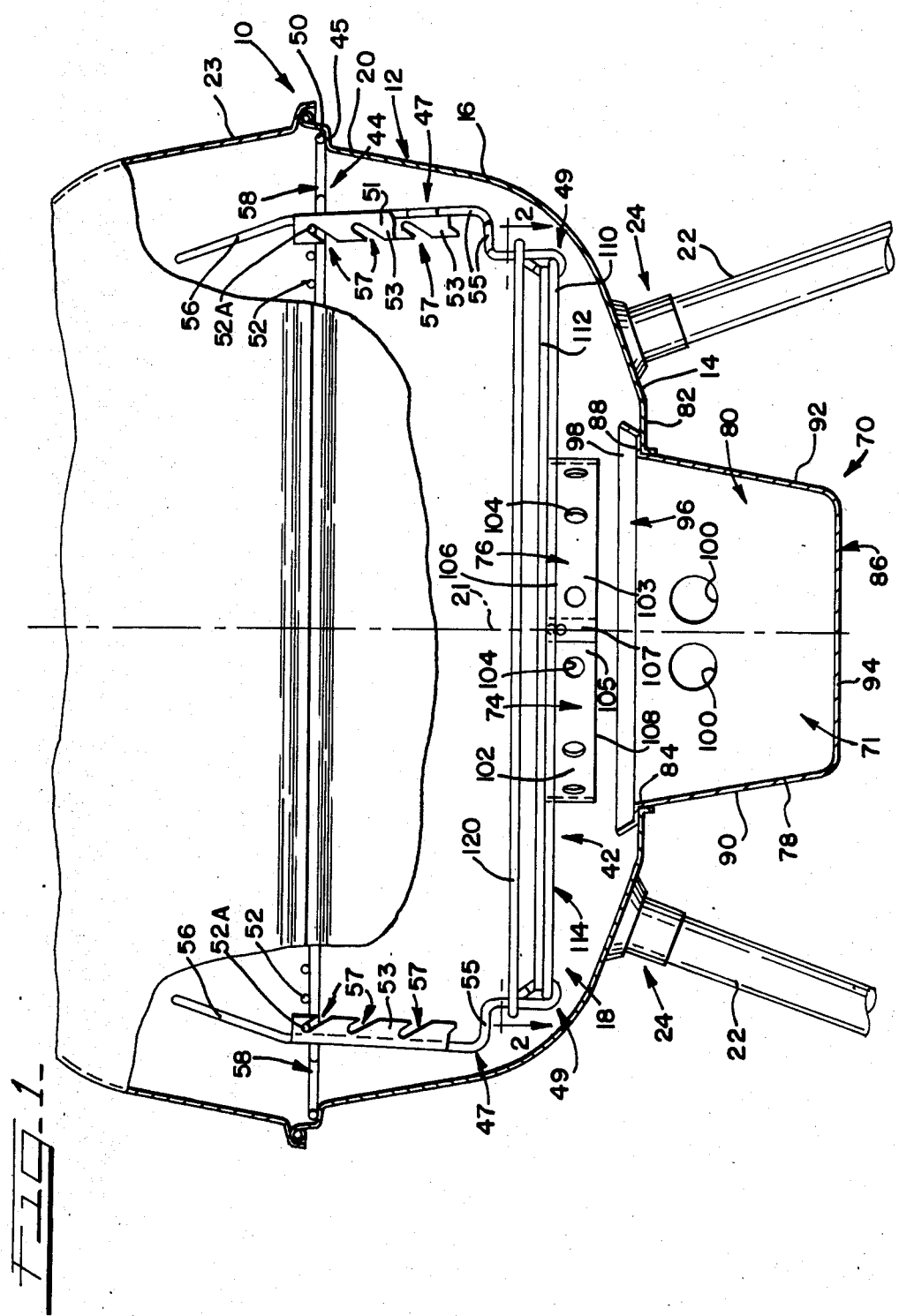

United States Patent [19]

Ogden

[11] Patent Number: 4,699,120

[45] Date of Patent: Oct. 13, 1987

[54] CHARCOAL GRID ARRANGEMENT FOR CHARCOAL GRILLS

[76] Inventor: Ralph Ogden, 1304 Fisher St., Munster, Ind. 46321

[21] Appl. No.: 919,443

[22] Filed: Oct. 16, 1986

[51] Int. Cl.[4] .............................................. F24B 3/00
[52] U.S. Cl. ................................. 126/25 A; 126/25 B
[58] Field of Search ................. 126/25 B, 25 R, 25 H, 126/9 R

[56] References Cited

U.S. PATENT DOCUMENTS

| D. 259,536 | 6/1981 | Douglas | D7/129 |
|---|---|---|---|
| 3,330,266 | 7/1967 | Stephen | 126/25 |
| 4,510,916 | 4/1985 | Ogden | 126/25 B |
| 4,603,679 | 8/1986 | Ogden | 126/25 B |

*Primary Examiner*—Carroll B. Dority, Jr.
*Attorney, Agent, or Firm*—Mann, McWilliams, Zummer & Sweeney

[57] ABSTRACT

A charcoal grid arrangement for barbeque grills, which grills are of the type comprising an open top receptacle defining a floor that is apertured at its center to receive and hold a discretely separate bowl forming a tinder receiver and ash collector at the central axis of the receptacle, with the receptacle supporting a food cooking grid across same from which is adjustably suspended the charcoal grid over the tinder receiver, with the charcoal grid itself being in the form of an open framework comprising a plurality of spaced apart rods of similar gauge fixed together in essentially parallel coplanar relation to have the charcoal grid define a central axis that is aligned with that of the receptacle, with the charcoal grid on its underside having a pair of spaced apart holder rods secured thereto in spaced apart coaxial relation and vertically aligned with a pair of coaxially aligned radii of the charcoal grid central axis and defining confronting but spaced apart end portions, and with the charcoal grid also having on its underside a pair of centering rod members centered on the receptacle central axis, and equivalently disposed on either side of the indicated pair of charcoal grid radii, and each defining a central apex between which a strip of resiliently flexible metallic material is centered in circular form when the arced strip is received in supporting relation to the confronting ends of the holder rods.

12 Claims, 3 Drawing Figures

CHARCOAL GRID ARRANGEMENT FOR CHARCOAL GRILLS

This invention relates to barbeque grills, and more particularly, to charcoal fired barbeque grills having paper start facility, several forms of which are disclosed in my U.S. Pat. Nos. 4,510,916, 4,569,876, and U.S. Pat. No. 4,603,679.

Barbeque grills of the type indicated retain the popular outdoor cooking attraction of this type of grill, while permitting the use of waste paper or the like to fire the charcoal, so that there is no need for the commonly required lighter fluid. As disclosed in said patents (the disclosures of which are hereby incorporated herein by this reference), the barbeque grill involved, that has paper start facility, comprises an open top receptacle that defines a floor that is centrally apertured to receive and support a tinder receiver in the form of a bowl, the side wall of which may include one or more draft openings and may be adjustable in size to adjust the air draft flow to the tinder receiver, the grill employing a conventional opening or orifice adjusting arrangement. The grill receptacle includes a charcoal support grid and means for removably mounting same in the receptacle over the receptacle floor and above and adjacent the level of the upper end of the tinder receiver. The grill also includes the usual food cooking grill and means for removably mounting same in the receptacle above the charcoal grid, after the charcoal is ignited.

In accordance with the practice of the invention of said patents the equipment associated with the grill includes a charcoal receiver in the form of an open ended sleeve of sheet metal material that includes, for instance, a pair of oppositely located upright manipulating handles adjacent to and spaced laterally of its upper end, with the charcoal receiver being proportioned to be disposed in substantially congruent relation with the tinder receiver, and on the charcoal support grid above the tinder receiver, for charcoal fire start purposes. The grill may be of any desired shape, and may be arranged for either opened or closed cooking, as desired.

When the grill is to be used, the grill cover, if any, the food cooking grid, and the charcoal support grid are removed and placed to one side. The tinder receiver is then charged with tinder, such as waste paper, wrapping paper, paper bags, or the like, and the charcoal grid is returned to an operative position overlying the grill receptacle floor and the tinder receiver. The charcoal receiver is then positioned on the charcoal support grid in substantially congruent relation with the tinder receiver, with the charcoal receiver then being charged with charcoal to the extent that the charcoal is needed for cooking the particular food project, such as the meat or fowl that is to be involved.

The tinder charge is then ignited through the tinder receiver bowl draft openings, by using a match or cigarette lighter or the like to effect initiation of burning of the tinder. As the tinder burns, the resulting flames and hot gases press upwardly into the charcoal receiver and about the charcoal, quickly effecting full ignition of the charcoal charge. As disclosed in said application Ser. No. 758,705, the charcoal grid on its underside may be provided with an open ended ring or sleeve that is formed by a length of suitable metallic material, such as ordinary steel, arched to have its ends suitably fixed together and secured to the grid underside, as by employing welding or the like. Such sleeve or ring in effect completes the tinder receiver, as to the chimney effect provided by the charcoal receiver when applied to the charcoal grid above same, and tends to counter the adverse effects of blowing wind when the grill is used out-of-doors.

When the charcoal charge is substantially or fully ignited, the user of the grill then grasps the handles of the charcoal receiver to lift the charcoal receiver upwardly as needed to discharge, and guide the discharge of the charcoal fully onto the charcoal support grid, with the lower end of the charcoal receiver being shifted to spread the charcoal over the charcoal grid as needed to appropriately position the ignited charcoal briquets involved as desired for cooking purposes.

The charcoal receiver is then put aside, after which the grill food cooking grid is disposed in its usual operative relation in the grill receptacle, relative to the charcoal grid, for food cooking purposes. The food cooking then can proceed in the usual manner, with the ignited charcoal providing the cooking heat free of the petroleum liquid starter fumes normally associated with lighter fluid (that is not needed in connection with the practice of the invention of my said patents and said patent application).

A principal object of the present invention is to provide a charcoal grill arrangement and a charcoal grid therefor of the types referred to, in which the sleeve or ring that is secured to the underside of the charcoal grid is arranged, and the grid itself is arranged, to simplify construction of the grid, by forming the sleeve or ring from a strip of resiliently flexible heat resistant material, such as ordinary steel, that is flexed to ring form to provide a baffle that is in centered relation to the charcoal grid and for essentially congruent relation to the grill tinder receiver, and is secured to the charcoal grid by mechanical connection to same, without welding or the like being required.

Another principal object of the invention is to provide a charcoal grid for charcoal grills that is economical of manufacture, easy to apply to the grill and use, efficient and long lived in use, and that when the charcoal grid is applied in its operative manner to the grill, the sleeve or ring forming baffle is centered on the tinder receiver and forms the upper portion of same, and that provides the added chimney effect and protection against blowing wind that the charcoal grid underside ring of my said patent application calls for.

In accordance with the present invention, the charcoal grill is provided in which the charcoal grid therefor is arranged for operative mounting in the grill in centered relation thereto and to the tinder receiver that is supported therebeneath by the grill.

In the specific arrangement of the charcoal grill disclosed in the present application, the charcoal grid is arranged for adjustable support from the food cooking grid when the latter is applied across the grill open top for cooking purposes, after the igniting of the charcoal.

The charcoal grid itself comprises an open framework that includes a plurality of spaced apart rods of similar gauge secured together in essentially parallel coplanar relation, with the framework defining the grid in question being formed to define a central axis that extends normally of the plane of the charcoal grid framework and coaxially of the grill central axis.

The charcoal grid framework also has on the underside of same a pair of opposed spaced apart holder rods defining spaced apart confronting ends that are respectively aligned with a first pair of coaxially oriented radii of the grill and grid central axes, with a pair of coplanar oriented centering rod members also being fixed to the charcoal grid framework underside on either side of and centered on said first pair of coaxially located radii relation, with the centering rod members each being obtusely angled to define a rod apex that for each centering rod is intermediate the ends thereof, and with the indicated centering rod apexes being respectively aligned with and bisected by a second pair of coaxially oriented radii of said grill and charcoal grid central axes, which second pair of radii extend normally of the indicated first pair of charcoal grid radii, and with the sleeve or ring that is to be affixed to the underside of the charcoal grid being in the form of a strip of resiliently flexible heat resistant material, such as ordinary steel, arced to ring configuration and placed in centering relation to the respective centering rods, in tangent relation to the latter adjacent the respective apexes thereof, and with the ends of the sleeve or ring overlapped and received on one of the indicated holder rod ends and with the portion of the strip opposing the indicated overlapped ends thereof being received on the other of said holder ends. The sleeve or ring forming strip in accordance with the invention is connected to the charcoal grid forming framework only by the indicated holder rod ends thereof, this being accomplished by forming apertures in the indicated strip that are slipped onto the respective holder rod confronting ends, with the inherent resiliency of the material forming the strip and the centering rod members holding the sleeve or ring in place as needed during use of the grill.

Use of the grill equipped with the charcoal grid of the present invention is as described above, except that when the charcoal is to be started, the charcoal grid is rested directly on the receptacle, within same so as to dispose the charcoal grid ring or sleeve in centered relation and above the tinder receiver so as to complete the tinder receiving chamber and provide the additional chimney effect when the charcoal receiver is applied to the charcoal grid for igniting of the charcoal as hereinbefore described. When the charcoal has been ignited, it is spread across the charcoal grid upper side in the manner already indicated, after which the food cooking grill is applied across the top of the grill compartment, and the charcoal grill is adjustably supported from the cooking grid at an elevation below the cooking grid as desired in accordance with the food being cooked. The food cooking can then proceed in the usual manner, with the ignited charcoal providing the cooking heat free of the problem causing lighter fluid, that has heretofore been required with most of the commonly used barbeque grills for starting the charcoal fire.

Figure 2:
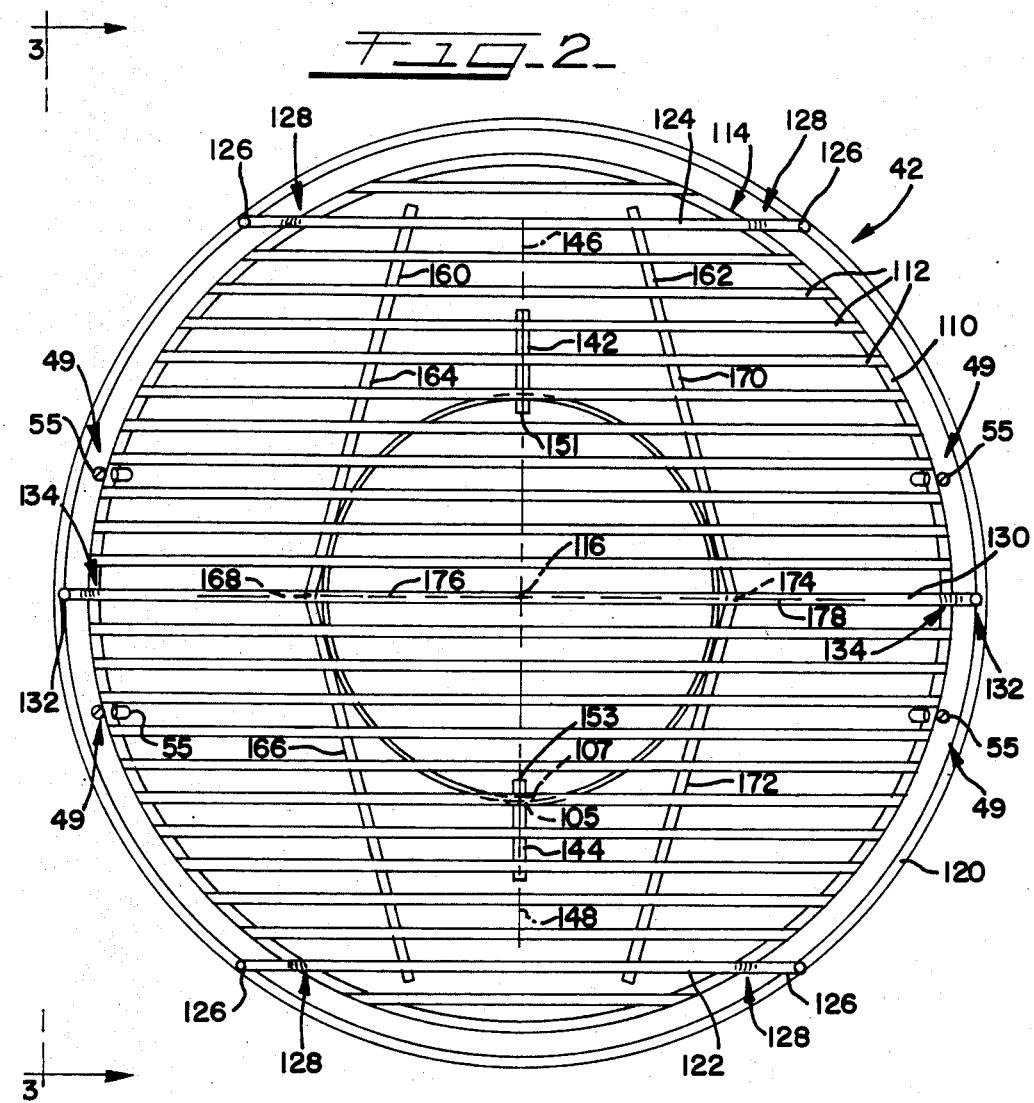
Figure 3:
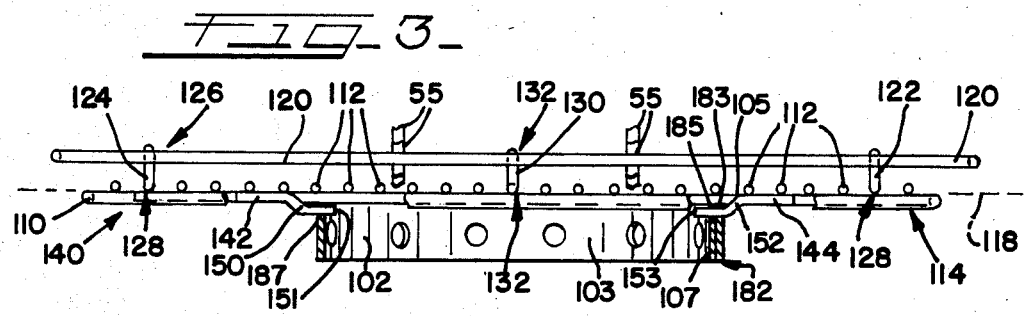

Other objects, uses, and advantages will be obvious or become apparent from a consideration of the following detailed description and the application drawings in which like reference numerals indicate like parts throughout the several views:

In the drawings:

FIG. 1. is a diagrammatic side elevational view, partially in vertical section, with parts broken away, of a grill to which the charcoal grid of the present application is applied, it being in the form illustrated adjustably suspended from the grill food cooking grid, and with the top ordinarily employed for closed cooking shown broken away and partially in section;

FIG. 2 is a top plan view of the charcoal grid itself, taken substantially along line 2—2 of FIG. 1; and FIG. 3 is a side elevational view of the charcoal grid of FIG. 2, taken substantially along line 3—3 of FIG. 2, and with the height adjustment handles of FIG. 1 omitted, and the charcoal grid being broken away, and its center ring that is functionally associated with the grill tinder receiver being shown in vertical section.

However, it is to be distinctly understood that the specific drawing illustrations provided are supplied primarily to comply with the requirements of the Patent Laws, and that the invention is susceptible of modifications and variations that will be obvious to those skilled in the art, and that are intended to be covered by the appended claims.

GENERAL DESCRIPTION

Reference numeral 10 generally indicates one embodiment of a barbeque grill arranged as contemplated by the present invention, which embodiment comprises a receptacle 12 defining a floor 14 and a side wall 16 which define cooking chamber 18. The receptacle 12 that is illustrated is of the common bowl type configuration in which the floor 14 and the side walls 16 are of integral one piece construction and have the generally hemispherical shell construction that is indicated in FIG. 1 and that is concentric about a central axis 21 of the grill 10. The grill receptacle 12 is open at its upper end and may be used for either opened or closed cooking purposes, and for closed cooking purposes a suitable cover 23 is provided, which is only diagrammatically illustrated in FIG. 1 as it is not part of the present invention.

The grill receptacle 12 is suitably supported, as by employing suitable legs 22 that in the grill form shown are three in number (only two are illustrated), disposed in approximately 120 degree tripod type spacing about the underportion of the receptacle 12, with the legs 22 being suitably connected in any convenient way to the receptacle 14, as at 24. As is conventional, the legs 22 may be provided with suitable feet that are adjustably mounted for supporting the grill on a suitable support surface, or the legs may be suitably connected with a two wheeled ground engaging support for ease of moving the grill from place to place, as is well known in the art. The invention is not concerned with the details of construction of the legs 22 or the support of the receptacle 12; consequently the diagrammatic illustrations of FIG. 1 with regard to the legs 22 have no particular concern with the present invention other than that the receptacle 12 should be suitably supported above the ground or other support surface for the grill to space the receptacle 12 therefrom, to dispose the receptacle 12 so that its cooking chamber 18 is essentially horizontally disposed, and to provide the air draft space for cooking as well as to space the cooking chamber 18 from the ground or other supporting surface due to the heat that is involved in the cooking procedure.

Grill 10 also includes a charcoal support grid 42 and the cooking food support grid 44, with the particular grill 10 illustrated being arranged so that the cooking food support grid 44 rests on annular shelf 45 that is defined by the receptacle 12 at its upper end 20, with the charcoal support grid 42 in use for cooking purposes being adjustably suspended from the food support grid 44 by suitable height adjustment handles 47 that are each pivotally connected in a conventional manner at 49 to opposite sides of the charcoal support grid 42. The handles 47 are two in number and may be of the type shown in my U.S. design patent application Ser. No.

881,461, filed July 2, 1986 (the disclosure of which is incorporated herein by this reference). As shown, the upper portion 51 of each handle 47 has a pair of flanges 53, from which each of which depends a separate mounting portion 55 of the respective handles 47 (that are of stiff wire characteristics and configuration and are appropriately shaped to be pivotally connected to the grid 42 as indicated at 49); flanges 53 also define several slots 57 which, for the respective flanges 53 of a handle 47, are elevationally paired and shaped to engage an end rectilinear rod 52A of the grid 44. The grid 44 is made up of a plurality of rectilinear rods 52 between the end rods 52A, which rods 52 and 52A are all suitably anchored to marginal rodding 50 of circular arcuate configuration that forms the margin of the grid 44. The rectilinear rods 52 of the grid 44 are spaced apart, as is conventional, to adequately support the various types of food that are to be cooked in grill 10, and depending on the specific type of grill involved with the grill illustrated being of the type typically employed for cooking steaks, chops, hamburgers and the like. Grid 44 may also have one or more handles suitably secured to same (not shown) for facilitating application and removal of grid 44 to and from grill 44, as is conventional.

In one form of the handles 47, the lower portions 55 of each handle 47 are integral with rodding that is of inverted U-shaped configuration defining a handle portion 56 that extends upwardly through spacing 58 between an end rod 52A and the margin rodding 50 at one end of the grid 44. The flanges 53 of each handle 47 are suitably affixed, as by welding or the like, to the legs of the handle rodding in question. The handle lower portions 55 are shaped to the indicated loop form to provide the pivotal connection of the respective handles 47 to the grid 42, as is indicated at 49.

The grill 10, in accordance with the disclosure of my said U.S. Pat. No. 4,603,679, includes a tinder receiver 70 that defines a tinder chamber 71. In the specific form of grill 10 that is illustrated, the tinder receiver 70 and the tinder chamber 71 are of two part construction, namely the tinder receiver shallow upper portion 74 defining tinder chamber shallow portion 76 and the tinder receiver major portion 78 defining the major portion 80 of the tinder chamber 71.

As indicated in FIG. 1, the grill receptacle 12 is shaped so that its floor 14 defines planar base portion 82 that is substantially centered with respect to the central axis 21 of the receptacle 12, and is disposed to be substantially horizontal when the receptacle 12 is mounted on its legs 22 for the usual support of the grill 10 from the ground or other suitable supporting surfacing. The receptacle horizontal lower portion 82 is formed to define arcuate opening 84 that is in coaxial relation with the grill central axis 21, with the opening or aperture 82 being proportioned to receive and support the dished wall structure 86 that forms the tinder receiver major portion 80, the dished wall structure 86 defining an annular flange 88 that rests under gravity on the receptacle floor portion 82, in normal use of the grill 10.

In the form of the grill 10 as illustrated, the dished wall structure 86 is in the form of a separate and removably or discrete bowl or compartment 90 including side wall 92 that is integral thereabout, and planar and imperforate bottom wall 94 that is also integral therewith and thereabout, with the bowl 90 and its wall structure 92, and floor 94 being of one piece construction and defining the major portion 80 of the tinder receiver 71.

The bowl 90 is open at its top or upper end 96 and is integral with an annular outwardly directed collar 98 that defines annular flanging 88. The side wall 92 of the bowl 90 is suitably apertured, as at 100, and on opposite sides of bowl 90 to provide for application of the air draft control devices that are disclosed in my said application Ser. No. 758, 705 , now U.S. Pat. No. 4,603,679, and that in and of themselves are conventional. As is also disclosed in my said U.S. Pat. No. 4,603,679, the bowl collar 98 may include one or more handles of the type disclosed in said U.S. Pat. No. 4,603,679, so that, when the grill 10 has been used to the extent that the ashes left over from the tinder employed to start the charcoal have reached a significant depth in the tinder chamber 71, well before the ashes tend to block the air draft control devices of which the apertures 100 are a part, on removal of the cover 23 and the two grids 42 and 44, the grill operator may grasp the handle or handles of the bowl 90 and lift the bowl 90 upwardly to remove it from the receptacle opening 84 and appropriately dump the tinder ashes in a trash can or the like, after which the bowl 90 is replaced to the position indicated in FIG. 1.

Further following the disclosure of said U.S. Pat. No. 4,603,679, the tinder receiver shallow upper portion 74 comprises open ended sleeve or ring 102 that is formed by a length or strip 103 of suitable metallic material, such as ordinary steel, arced to have its ends 105 and 107 brought in overlapping relation, and connected to the grid 42 to form a part of same, as is hereinafter disclosed. Sleeve or ring 102 may be optionally apertured to define a multitude of draft openings or ports 104 that are in spaced relation about the length of the sleeve or ring 102, 360 degrees thereabout, to augment the air draft flow into the tinder chamber 71, with air flow from within the chamber 18. The sleeve or ring 102 defines open upper end 106 and open lower end 108, with the sleeve or ring 102 being connected to the grid 42, and the grid 42 being supported within chamber 18, to dispose the sleeve or ring 102 in approximately centered relation within the grill receptacle 12 and above the bowl 90 in closely spaced relation thereto so as to complete the tinder receiver 70 and tinder chamber 71.

In the arrangement of the present invention, the charcoal receiving grid 42 is formed so that the sleeve or ring 102 becomes a part of same without having to employ welding or the like to fix the ring or sleeve 102 in place.

Referring now to FIGS. 2 and 3, which are directed primarily to the grid 42, it will be observed that the grid 42 is of generally circular marginal outline for complementry fit purposes within receptacle 12, as is grid 44. The grid 42 comprises marginal circular rodding 110 to which are suitably fixed in spaced apart relation appropriate lengths of rectilinear rodding 112 to form a grid framework 114 that has a central axis 116 that is to be in substantial coaxial relation with the central axis 21 of the grill 10 in the operating positions of the grid 42 within the grill 10. The framework 114 is essentially planar in configuration, with the rectilinear rodding lengths 112 each being of similar gauge and secured in place in essentially coplanar relation whereby the framework 114 defines the plane 118 that is indicated in FIG. 3.

In particular form of grid 42 that is shown, the grid 42 includes an upper marginal circular rodding 120 that is anchored to the circular rodding 110 by a pair of elongated end rods 122 and 124 that are suitably welded as at 126 to the rodding 120, and that are angled and suitably welded to the rodding 10 where indicated at 128. Similarly, across the midportion of the grid 42, a center reinforcing rod 130 is provided, that is welded to the rodding 120 as at 132 and that is angled and suitably welded to the rodding 110, as at 134.

In the form shown the lower portions 55 of the respective handles 47 are pivotally connected, as at 49, to the rodding 102 in the manner indicated in FIG. 1.

Further in accordance with the invention, the framework 114 on its underside 140 has suitably affixed to same in spaced apart relation a pair of spaced apart holder rods 142 and 144 that are of essentially the same gauge as the rods 112 that are of relatively short length and that are fixed to the undersides of the rods 112 to be disposed for alignment with a first pair of coaxially oriented radii 148 of the framework central axis 116. The holder rods 142 and 144 are spaced apart from such central axis 116 and respectively define confronting end portion 150 and 152 that, as indicated in FIG. 3, are downwardly displaced to define coaxial ends 151 and receive the sleeve 102 in the manner indicated in FIGS. 2 and 3.

Also suitably affixed to the undersides of the rods 112 and the underside 140 of the framework 114, are a spaced apart pair of centering rod members 160 and 162. The rod member 160 defines rectilinear segments 164 and 166 that merge at the apex 108 thereof that is indicated in FIG. 2, while the rod member 162 defines rectilinear segments 170 and 172 that merge together at apex 174 of the rod member 162. Thus, the segments 164 and 166 are obtusely angled relative to each other to define the apex 168 of the centering rod member 160, while the segments 170 and 172 are obtusely angled relative to each other to define the apex 174 of the centering rod member 162. The obtuse angulation involved is referably identical and at approximately 150 degrees. Rod members 160 and 162 are suitably affixed, as by employing welding, to the underside 140 of the grid framework 114, and in coplanar relation, and are located on the framework 114 relative to its central axis 116 so that the respective apexes 168 and 174 thereof are aligned with and are substantially bisected by a second pair of coaxially oriented radii 176 and 178 that extend normally of the respective radii 146 and 148.

The location of the respective holder rods 142 and 144, and especially their confronting ends 151 and 153, is made such that when the sleeve or ring 142 is formed from metal strip 103, and the ends 105 and 107 of the strip overlapped as indicated at 182 in FIG. 3, a sleeve or ring 102 will have an internal diameter appropriate to the size of the open end 96 of bowl 90, and also be proportioned for mounting on the respective holder rods 142 and 144, and be centered relative to the framework 114 by the respective centering rods 160 and 162.

For this purpose, the end portions 105 and 107 of the strip 103 that are to be brought into juxtaposition to form the sleeve or ring 102 are formed with a pair of apertures 183 and 185 that are aligned and proportioned to receive the end 153 of the holder rod 144. The strip at a location from the aligned strip end apertures 183 and 185 that will be disposed 180 degrees from such strip end apertures as received on the end 151 of holder rod 144 is formed with an aperture 187 proportioned to receive the end 151 of the holder rod 142.

In mounting the strip 103 in position on the underside 140 of framework 114, and before the handles 47 are applied thereto, the grid 42 is inverted and placed on a flat horizontally disposed surface, after which the holder rods 142 and 144, and the centering rods 160 and 162 are appropriately affixed to the underside of the framework 114, commensurate with the size of the open end 96 of the bowl 90 for the particular grill 10 under construction. The strip 103, which may be formed from a suitable heat resistant, resiliently flexible material, such as ordinary steel, has a length commensurate with the sleeve or ring 102 to be formed from particular grill 10 to which the grid 42 is to be applied, is then bent to the circular configuration indicated with the end apertures 183 and 185 of same overlapped and aligned to receive the end 153 of the holder rod 144. The arced strip 103 then may be flexed as needed to apply its oppositely located aperture 187 to the end 151 152 of the holder rod 142 with the result that the sleeve or ring 102 is formed and centered relative to the framework 114 by the centering rods 160 and 162 that thus have their respective sections 164, 166, 170 and 172 disposed in tangent relation thereto, and the sleeve or ring 102 held to the grid 42 by the sleeve or ring being thus received over the end portions 150 and 152 of the respective holder rods 142 and 144.

It thus may be observed that the sleeve or ring 102 forming the upper portion 74 of the tinder receiver 70 is secured in place without welding the strip 103 in position, and further, the strip 103 is removable by bending same as needed to disconnect same from the respective holder rods 142 and 144. The anchoring of strip 103 to grid 42 as herein disclosed avoids the need to use welding for this purpose, whereby the difficulties and time consumption involved in welding ring 102 to grid 42 are both avoided, and the ring 102 may also be easily replaced by the grill user, as needed. Thus, fabrication and repair of grid 42 and its associated parts are greatly facilitated.

With the grid 42 completed, in the form of same shown in the drawings, the handles 47 are suitably applied thereto for suspending same from the food holding grill 44 during cooking. When the charcoal is to be initially ignited for cooking purposes, the procedure disclosed in my said U.S. Pat. No. 4,603,679 is preferably employed, pursuant to which the cover 23 and the food supporting grid are totally removed, and the grid 42 is rested on the lower portion of the receptacle 12 in a position in which the sleeve or ring 102 will be disposed with slight spacing above the open end 96 of the bowl 90 to which the tinder has previously been applied. With this position of the components involved, the charcoal receiver is applied to the upwardly facing side of the grid 42, appropriately filled with the charcoal briquets, and the tinder in the tinder receiver 70 ignited through one of the apertures 100. After the charcoal has been ignited, it is spread across the upper side of the charcoal support grid 42 in the manner disclosed in said application and the food support grill is returned to be positioned for cooking use, as in the position indicated in FIG. 1. The handles 47 are then gripped by the grill user to raise the charcoal support grll 42 to the elevational position desired for cooking purposes, as defined by one of the pair of the grooves 57 defined by the respective handles 47 and applied to an end rod 52A of the food support grid 44 (the food support grid 44 thus defining at opposite ends of same the open space 58 for the respective handles 47 to be disposed in their upright positions and yet permit free removal of the food support grid 44 from the grill 10 for application of the charcoal receiver to the charcoal support grid 42).

When it is desired to empty ash from the bowl 90, the cover 23 and both grids 42 and 44 removed so that the grill user may reach the bowl 90 and freely remove it from the grill 10 for dumping of the ash. On reapplication of the bowl 90 to the grill to the position indicated in FIG. 1, the tinder may be applied thereto, after which the grid 42 is returned to the initial start position indicated for application thereto of the charcoal receiver and the firing of the tinder in the bowl 90.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A charcoal grid for charcoal barbeque grills, said grid comprising:
   an open framework comprising a plurality of spaced apart rods of similar gauge secured together in essentially parallel coplanar relation,
   said framework being formed to define a central axis extending normally of the plane of said framework,
   a pair of opposed spaced apart holder rods fixed to one side of said framework,
   said holder rods defining confronting spaced apart end portions that respectively lie aligned with a first pair of coaxially oriented radii of said central axis,
   a pair of centering rod members fixed to said one side of said framework on either side of said first pair of said coaxially located radii of said axis and in coplanar relation,
   said centering rod members each being obtusely angled to define a rod apex,
   said rod apexes of said centering rod members being respectively aligned with a second pair of coaxially oriented radii of said framework central axis that extend normally of said first pair of radii,
   said centering rod members being centered on and to either side of said framework central axis,
   and a strip of resiliently flexible heat resistant material arced to ring configuration with the ends of same overlapped and received on one of said holder rod end portions,
   and with the portion of said strip opposing said overlapped ends thereof being received on the other of said holder rod end portions,
   said arced strip being in tangent relation to said centering rod members adjacent their respective apexes.

2. The charcoal grid set forth in claim 1 wherein:
   said centering rod members are angled approximately 150 degrees to define the respective apexes thereof, said apexes projecting oppositely of each other.

3. The charcoal grid set forth in claim 1 wherein:
   said strip is connected to said framework only by said holder rod ends.

4. The charcoal grid set forth in claim 1 wherein:
   said one side of said framework is the underside thereof.

5. The charcoal grid set forth in claim 1 wherein:
   said holder rods and said centering rod members are in coplanar relation on said underside of said framework,
   with said holder rod end portions being downwardly indented to hold said strip in substantial abutting relation to said framework.

6. The method of making a charcoal grid for charcoal barbeque grills, said method comprising:
   forming an open framework out of a plurality of rods of similar gauge with said rods being secured together in essentially parallel, coplanar relation for orienting said framework to define a central axis extending normally of the plane of said framework,
   fixing to the underside of said framework a pair of holder rods oriented to lie in spaced apart relation and vertically aligned with a pair of coaxially oriented radii of said central axis,
   taking strip of resiliently flexible heat resistant material and bending same substantially into ring configuration with its ends disposed in overlapping relation,
   and mounting said bent strip overlapped ends on one of said holder rods and an intermediate portion of said strip on the other of said holder rods.

7. The method set forth in claim 6 wherein:
   said strip in being mounted on said holder rods is centered relative to said axis.

8. In a barbeque grill that includes a receptacle of open top bowl configuration having a central portion centered on same, at a central axis that extends normally of the plane of the receptacle top, with the receptacle defining a floor that is centered on the axis, and including a charcoal support grid and means for removably mounting same in the receptacle above and in operative overlying relation to the receptacle floor, and a food cooking grid and means for removably mounting same above and in operative overlying relation to the charcoal support grid, with the grids being respectively proportioned to be substantially centered on the central axis when mounted in the receptacle in their respective operative relations, and with the grids being disposed normally of the central axis when mounted in the receptacle in their respective operative relations, and means for mounting the receptacle for cooking purposes with the central axis of the receptacle substantially vertically disposed, a tinder receiver located below the level of the charcoal support grid, when the latter is in its said operative relation, and comprising a tinder receiving chamber that is substantially centered on the central axis and that is proportioned transversely of said central axis to receive a tinder charge of predetermined size, said tinder receiver defining an open container into which the tinder charge may be inserted into said tinder receiving chamber when the grids are removed from the receptacle for charging said tinder receiver with tinder, said tinder receiver underlying the charcoal support grid across said container thereof when said charcoal support grid is in its operative relation,
   the improvement wherein said charcoal support grid comprises:
   an open framework comprising a plurality of spaced apart rods of similar gauge secured together in essentially parallel coplanar relation,
   said framework being formed to define a central axis extending normally of the plane of said framework,
   a pair of opposed spaced apart holder rods fixed to the underside of said framework,
   said holder rods defining confronting spaced apart end portions that respectively lie vertically aligned with a first pair of coaxially oriented radii of said central axis, a pair of centering rod members fixed to said underside of said framework on either side of said first pair of said coaxially located radii of said axis and in coplanar relation, said centering rod members each being obtusely angled to define a rod apex intermediate their respective ends, said rod apexes of said centering rod members being respectively aligned with a second pair of coaxially oriented radii of said framework central axis that extend normally of said first pair of radii, said centering rod members being centered on and to either side of said framework central axis, and a strip of resiliently flexible heat resistant material arced to ring configuration with the ends of same overlapped and received on one of said holder rod end portions, and with the portion of said strip opposing said overlapped ends thereof being received on the other of said holder rod end portions, said arced strip being in tangent relation to said centering rod members adjacent their respective apexes.

9. The improvement set forth in claim 8 wherein:
said centering rod members are angled approximately 150 degrees to define the respective apexes thereof,
said apexes projecting oppositely of each other, and being respectively substantially bisected by the respective second pair of said radii.

10. The improvement set forth in claim 8 wherein:
said strip is connected to said framework only by said holder rod ends.

11. The improvement set forth in claim 8 wherein:
said holder rods and said centering rod members are in coplanar relation on said underside of said framework,
with said holder rod end portions being downwardly indented to hold said strip in substantial abutting relation to said framework.

12. The improvement set forth in claim 8 including:
means for adjusting the height of said charcoal support grid relative to the tinder receiver.

* * * * *